US005796202A

United States Patent [19]

Herron et al.

[11] Patent Number: 5,796,202

[45] Date of Patent: Aug. 18, 1998

[54] TIE BOLT AND STACKED WHEEL ASSEMBLY FOR THE ROTOR OF A ROTARY MACHINE

[75] Inventors: William Lee Herron, Greer, S.C.; Frederick Martin Miller, Cincinnati, Ohio; William Gary Klump, Simpsonville, S.C.

[73] Assignee: General Electric Co., Schenectady, N.Y.

[21] Appl. No.: 803,485

[22] Filed: Feb. 20, 1997

[51] Int. Cl.$^{6}$ .......... H02K 1/28

[52] U.S. Cl. .......... 310/217; 310/42; 310/264

[58] Field of Search .......... 411/232, 233, 411/234, 235, 236; 310/42, 217, 264, 261

[56] References Cited

U.S. PATENT DOCUMENTS

| | | | |
|---|---|---|---|
| 255,802 | 4/1882 | Marks | 411/236 |
| 759,713 | 5/1904 | Hopping | 411/235 |
| 1,490,024 | 4/1924 | Quinn | 411/235 |
| 4,638,199 | 1/1987 | Brem et al. | 310/91 |
| 4,942,324 | 7/1990 | Ooyama et al. | 310/216 |
| 5,635,785 | 6/1997 | Schwanda et al. | 310/270 |

*Primary Examiner*—Steven L. Stephan
*Assistant Examiner*—Judson H. Jones
*Attorney, Agent, or Firm*—Nixon & Vanderhye

[57] ABSTRACT

Stacked wheels of the rotor of a rotary machine are axially coupled to one another by tie bolt assemblies. Each tie bolt assembly includes a stud having externally threaded opposite ends. A forward end of each stud is threaded into a non-rotatable windage nut. The aft end of each stud is secured by a primary nut having a plurality of facets, a jam nut locked against the primary nut and an anti-rotation cover between the jam nut and primary nut. The anti-rotation cover includes wings engaged against a next-adjacent wheel, preventing rotation of the cover relative to the rotor. Internal surfaces of the cover have facets greater in number than the number of facets on the primary nut whereby fine clock orientation of the cover relative to the adjacent wheel is obtained. The cover and primary nut are thus locked against rotation, thereby locking the stud/nut assembly against rotation relative to the rotor.

15 Claims, 2 Drawing Sheets

TIE BOLT AND STACKED WHEEL ASSEMBLY FOR THE ROTOR OF A ROTARY MACHINE

TECHNICAL FIELD

The present invention relates to rotary machines, for example, turbines and/or compressors, and particularly relates to a tie bolt and stacked wheel assembly for the rotors of such machines wherein tie bolts retain the stacked wheels in assembled relation without relative rotation between the tie bolts and the stacked wheels.

BACKGROUND

The rotors of rotary machines such as turbines and compressors are typically formed of axially stacked wheels which hold individual blades about their periphery. For example, compressor rotors include a series of individual compressor wheels stacked together with a set of tie bolts extending generally axially through the stack, the wheels mounting the blades which, together with stator blades, form the compressor stages. The tie bolts are typically elongated studs threaded at both ends for receiving nuts to maintain the wheels in stacked, assembled relation relative to one another. It will be appreciated, however, that the tie bolts can have a headed end, if desirable. In many such rotors formed of stacked wheels, the stacked wheels have ridges-and-groove arrangements along their interfaces so that the rotor torque can be carried through the stack. In a preferred form, however, sufficient clamp load is applied to the tie bolts to ensure that the rotor torque is carried through the stack by friction between the faces of the wheels and the nut faces.

It will be appreciated that any loosening of the nuts on the tie bolts would clearly reduce the tension on the bolts and, thus, lower the torque carrying capability of the rotor, eventually to unacceptable levels. Recognizing this as a problem, current design practice requires that the rotation of the nut relative to the bolt is prevented by redundant methods. One such method relies on the nut face friction against the threads and the stack. A second method of preventing rotation of the nut relative to the bolt is to run a jam nut against the primary nut to prevent its rotation relative to the stud. The nut at one end may be a shaped windage nut that, because of its shape, cannot rotate within its slot. D-head nuts also introduce the same anti-rotation capabilities. However, while these features prevent rotation of the nut, they do not prevent the bolt from rotating relative to the nut. To prevent this, current practice includes staking the shaft counterbore into a groove machined in the end jam nut. The aft end bolt has the same general features. In general, crimping the nut to an out-of-round condition accomplishes the objective of preventing the bolt from rotating within the nut but damages the bolt threads. Accordingly, it has been found desirable to provide an anti-rotation tie bolt and stacked wheel assembly which will prevent relative rotation between the nut and bolt and the tie bolt assembly relative to the stacked wheels of the rotor in a manner which will not damage the tie bolt assembly or rotor.

DISCLOSURE OF THE INVENTION

In accordance with the present invention, there is provided a tie bolt and stacked wheel assembly for the rotor of a rotary machine wherein stacked wheels are joined one to the other in an axial array by tie bolts, preferably studs, passing through aligned apertures of the wheels and secured at opposite ends by nuts which are prevented from rotating relative to the studs and which tie bolt assemblies are prevented from rotating within the rotor. One end, for example, the forward end of each stud forming part of the stacked wheel assembly may have external threads and be received in windage nuts. Windage nuts are shaped nuts which engage surfaces of the wheels or adjacent nuts whereby the nuts are prevented from rotating relative to the wheels. The windage nuts have internally threaded apertures for receiving the externally threaded ends of the studs. The opposite end of the studs, i.e., the aft ends, are similarly externally threaded. Each externally threaded aft end of a stud has a multi-faceted, preferably 12-point, nut threaded down on the stud to clamp the wheels between the forward and rear nuts. A standard jam nut is applied to the end of the stud to essentially lock the primary nut to the stud.

To prevent rotation of the primary nut relative to the rotor and also to prevent the stud and nut combination from rotating within the rotor, an anti-rotation cover is disposed between the primary and jam nuts. The anti-rotation cover includes a generally circular disk having an aperture for receiving the threaded end of the stud. A projecting, preferably cylindrical, member overlies a portion of the primary nut and particularly the multi-faceted portion. The interior surface of the cover member is multi-faceted to a much greater extent than the number of facets of the primary nut. The disk portion of the anti-rotation cover, e.g., the aft end of the cover when used as part of the aft end tie bolt assembly, has radially outward projections. The projections form a relatively smooth lateral edge which engages radially under or within a shoulder on the same wheel against which the nut seats, or on an adjacent wheel which is secured in the stack of wheels by other additional tie bolt assemblies. Preferably, the lateral edge of the cover forms a radius smaller than the radius of the shoulder of the adjacent wheel. By providing more facets on the cover than on the primary nut, fine clock orientation of the cover relative to the nut is achieved, facilitating alignment of the radiussed edge of the cover with the internal diameter of the shoulder on the adjacent rotor wheel when installed on the stack. By engaging the projections, i.e., the lateral edge, against the shoulder, and engaging the facets of the cover with the facets along the primary nut, relative rotation between the rotor and the primary nut is precluded. Also, the engagement of the cover with the primary nut prevents rotation of the tie bolt and nut assembly relative to the stacked wheels of the rotor.

In a preferred embodiment according to the present invention, there is provided a tie bolt and stacked wheel assembly for the rotor of a rotary machine, comprising a plurality of stacked wheels for rotation about a common axis and forming part of the rotor, a plurality of elongated tie bolts passing through the stacked wheels for retaining the stacked wheels in assembled relation relative to one another and spaced from one another circumferentially about the rotor, at least one of the tie bolts having external threads at one end, a first nut threaded onto the all externally threaded end of the one tie bolt and having a plurality of facets for tightening the nut about the one tie bolt end, a cover having a central aperture for receiving the one end of the tie bolt and a recess on one side thereof defined by an axially extending member for receiving at least a portion of the nut, an internal surface of the member about the nut portion having a plurality of facets in excess of the number of facets on the nut and a radially outwardly projecting portion carried by the cover for engaging a portion of the rotor for preventing rotation of the one tie bolt within the stacked wheels of the rotor.

In a further preferred embodiment according to the present invention, there is provided a tie bolt and stacked wheel assembly for the rotor of a rotary machine, comprising a plurality of stacked wheels for rotation about a common axis and forming part of the rotor, a plurality of elongated studs passing through the stacked wheels for retaining the stacked wheels in assembled relation relative to one another and spaced from one another circumferentially about the rotor, each of the studs having external threads at opposite ends thereof, first nuts threaded onto the externally threaded ends of the studs at one end thereof and having a plurality of facets for tightening the nuts about the studs at the one end thereof, a plurality of second nuts carried by the rotor against rotation relative to the rotor and threaded receiving the respective opposite externally threaded ends of the studs, a plurality of covers each having a central aperture and a recess on one side thereof defined by an axially extending member for receiving at least a portion of the nut, the covers being disposed on the one ends of the studs with the one stud ends received through the apertures, an internal surface of each member about the first nut portion having a plurality of facets in excess of the number of facets on the nut, a jam nut threaded on each of the one stud ends and on a side of the cover thereon remote from the first nut for preventing rotation of the first nut relative to the stud and a radially outwardly projecting portion carried by each cover for engaging a portion of the rotor for preventing rotation of the studs within the stacked wheels of the rotor.

Accordingly, it is a primary object of the present invention to provide a novel and improved tie bolt and stacked wheel assembly for the rotor of a rotary machine such as a turbine or compressor wherein the nuts secured to the tie bolts to maintain the wheels in stacked relation are prevented from unthreading relative to the rotor and the nut and tie bolt assembly is prevented from rotating relative to the rotor.

BEST MODE FOR CARRYING OUT THE INVENTION

Figure 1:
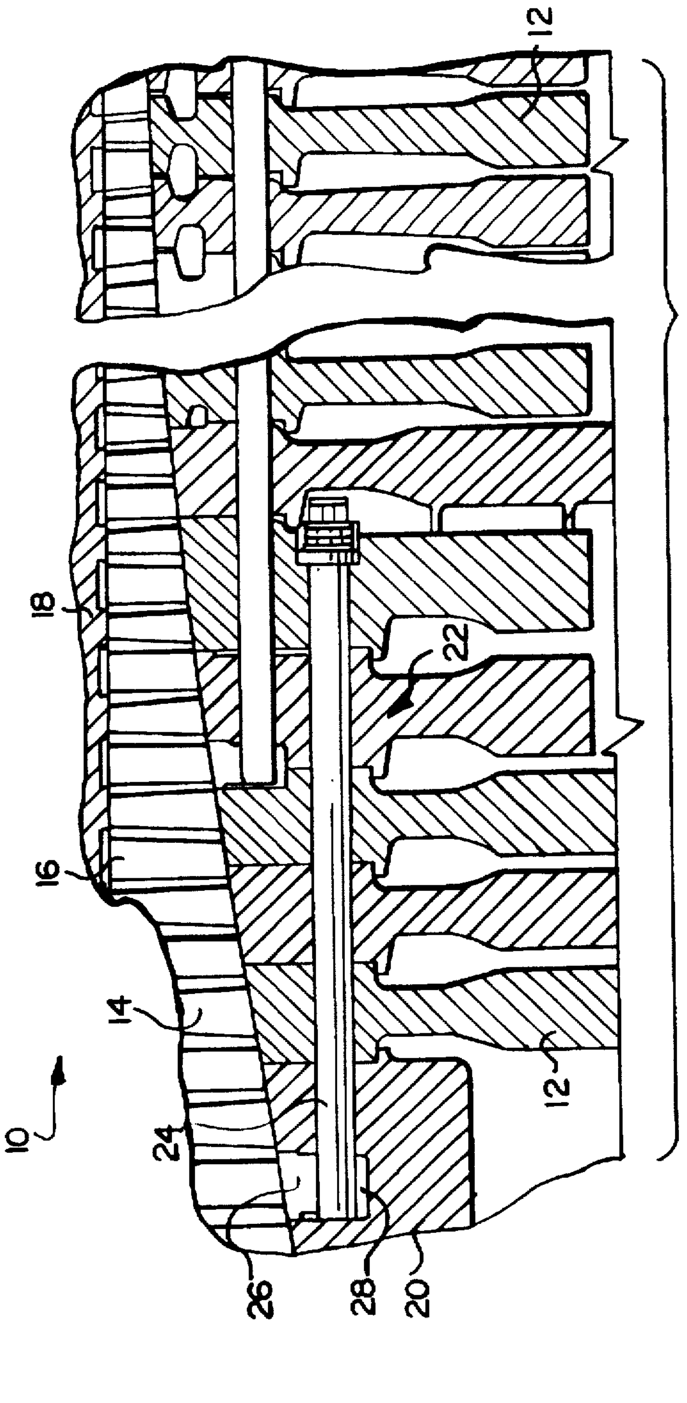
FIG. 1 is a fragmentary cross-sectional view through one-half of a stacked wheel assembly of a rotor for a rotary machine such as a compressor or a turbine and illustrating a tie bolt assembly according to the present invention.

Referring now to the drawings and particularly to FIG. 1, there is illustrated a rotary machine which may be a turbine or compressor, in this instance, a compressor, which is generally designated 10. The compressor includes a plurality of wheels 12 axially stacked relative to one another, with each wheel mounting a plurality of circumferentially spaced compressor blades 14. Stator blades 16 supported by the compressor housing 18 alternate between the compressor blades 14 along the various stages of the compressor in a conventional manner. A multi-stage wheel 20 is illustrated adjacent the forward end of the compressor 10 and the last few stages of the compressor, excluding the final stage, is illustrated.

The wheels 12 are maintained in axially stacked relation to one another by a plurality of circumferentially spaced tie bolt assemblies, generally designated 22. In the particular compressor illustrated, the tie bolt assemblies 22 are provided in first and second sets, with the first or forward tie bolt assemblies 22 coupling the first through the tenth stages to one another, while a second or aft set of tie bolt assemblies couple stages eight through eighteen to one another. As illustrated, the forward and aft tie bolt assemblies overlap one another in the region of the eighth and ninth stages whereby the wheels 12 of the compressor are maintained in axially stacked relation to one another. It will be appreciated that the wheels frictionally engage one another and thus form the rotor of the rotary machine.

The forward and aft tie bolt assemblies may or may not be identical to one another and only the forward tie bolt assembly 22 will be described in detail. Also, only one tie bolt assembly 22 is illustrated, it being understood that a plurality of tie bolt assemblies are disposed at circumferentially spaced locations about the rotor. Each of the tie bolt assemblies 22 includes a tie bolt, e.g., preferably an elongated stud, having externally threaded opposite ends, although it will be appreciated that an elongated shaft with a head at one end may be used. At the forward end of each stud 24, there is provided a windage nut 26. Each windage nut 26 is disposed in an annular recess 28 formed about the periphery of the multi-stage mounting wheel 20. The windage nuts 26 are each generally rectilinear in shape, although the outer surfaces are curved to conform to the outer curvature of the rotor. The nuts may have various configurations within that outer surface for weight saving purposes. Suffice to say, however, that the windage nuts 26 have internally threaded apertures for threadedly receiving the externally threaded forward ends of the studs 24. It will be appreciated that the nuts cannot rotate relative to the rotor because of their engagement with one another about the periphery of the multi-stage mounting wheel 20.

Figure 3:
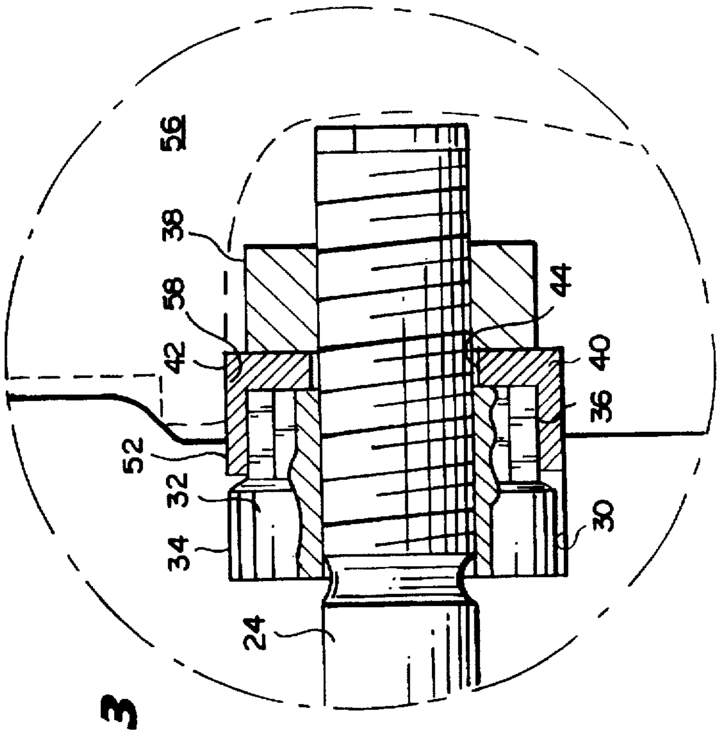
FIG. 3 is an enlarged cross-sectional view of the aft end of the tie bolt assembly illustrated in FIG. 2.
Figure 2:
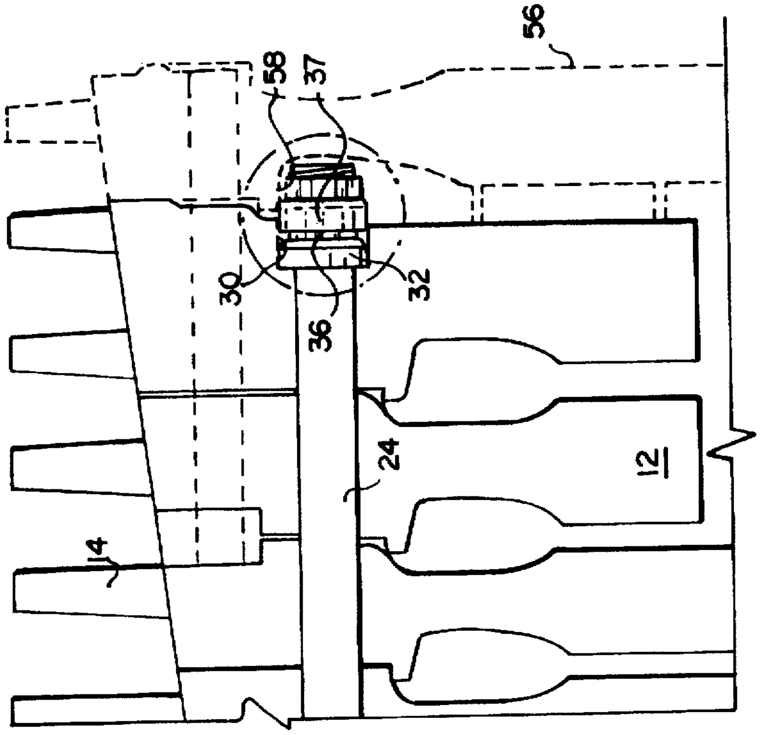
FIG. 2 is an enlarged fragmentary elevational view of the aft end of the first tie bolt assembly.

Referring particularly to FIGS. 2 and 3, the aft end of the externally threaded stud is received in a counterbore 30 along the aft side of a wheel 12, the externally threaded end projecting through the counterbore beyond the end of the wheel. A multi-faceted nut, for example, a 12-point nut 32, is threaded onto the end of stud 24, as illustrated in FIG. 3. Nut 32 has a generally circular base portion 34 and a reduced portion 36 carrying or mounting the facets 37 of the nut. To lock the primary nut 32 to the end of the stud 24, a jam nut 38 is similarly threaded about the end of stud 24. The jam nut 38 and primary nut 32 place the threaded end section of the stud 24 in tension and lock the nuts to the stud.

Figure 4:
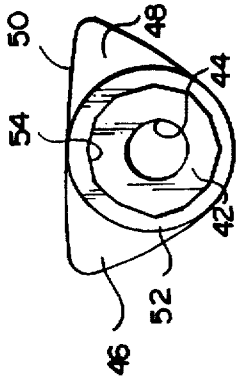
FIG. 4 is an end view of the anti-rotation cover looking from left to right in drawing FIG. 3.

In order to redundantly prevent rotation of the primary nut relative to the stud and to prevent rotation of the primary nut and stud, i.e., the tie bolt assembly relative to the rotor, an anti-rotation cover 40 is provided between the primary nut 32 and jam nut 38. The anti-rotation cover 40 includes a base 42 having a central aperture 44 therethrough for receiving the end of the stud. As illustrated in FIG. 4, the base 42 has a pair of generally radially outwardly projecting portions 46 and 48 which, in the end view of the cover 40 of FIG. 4, combine to form a generally D-shaped configuration at the base 42. Also, portions of the edges of surfaces 46 and 48 align with one another and form a continuous surface 50. Projecting axially from the base 42 is a member 52 which is generally cylindrical about its outer surface for reception in the counterbore 30 of the aft wheel secured by the forward tie bolt assemblies 22. The internal surface of the member 52, however, has a plurality of facets 54 which are in excess of the number of facets 37 about the reduced portion 36 of the primary bolt 34. For example, if the primary bolt has twelve facets, the internal surface 54 of the anti-rotation cover 40 may have a larger number of facets, for example, 24 facets. It will be appreciated that the anti-rotation cover 40 and the reduced portion 36 of the primary nut 34 are thus configured such that when the faceted portion of the primary nut is received within the member 52, the facets on the cover and nut prevent relative rotation therebetween.

Referring back to FIG. 2, the next-adjacent wheel of those wheels secured together by the aft set of tie bolt assemblies is illustrated by the dashed lines 56. A forward portion or rim of wheel 56 defines a shoulder or flange 58. The shoulder 58 is preferably a continuous annular shoulder about the forward face of wheel 56, although it will be appreciated that the shoulder need not be continuous but only in those areas adjacent the surfaces 50 of the anti-rotation covers of the forward set of tie bolt assemblies, as will become clear from the ensuing description. Particularly, the radius of the surface 50 on the anti-rotation cover 40 is slightly smaller than the radius of the shoulder or flange 58 on the adjacent wheel 56. The clock orientation of the cover 40 with respect to the nut 32 is significant. The additional facets on the inner surface of the cover 50 in comparison with the facets on the reduced portion 36 of primary nut 32 permits a finer clock orientation of the cover about the axis of nut 34 so that the surface 50 of the anti-rotation cover 40 may bear against the opposing arcuate surface 58 of the adjacent wheel. The more facets the cover has in relation to the facets of the primary nut, the finer the clock orientation of the cover about the primary bolt 34 and the less opportunity for relative rotation between the cover and the adjacent wheel 56.

It will be appreciated that by engaging the projecting portions 46 and 48 along the shoulder 58 of the adjacent wheel, the anti-rotation cover is prevented from rotating relative to the rotor and to the primary nut 34. By forming facets on the inside surface of the anti-rotation cover and engaging those facets with the facets of the primary nut 34, the primary nut 34 is similarly locked against rotation relative to the rotor. Thus, the entire stud/nut, i.e., tie bolt assembly is prevented from rotating relative to the rotor due to the locking action of the jam nut and primary nut to the stud.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tie bolt and stacked wheel assembly for the rotor of a rotary machine, comprising:

a plurality of stacked wheels for rotation about a common axis and forming part of the rotor;

a plurality of elongated tie bolts passing through said stacked wheels for retaining the stacked wheels in assembled relation relative to one another and spaced from one another circumferentially about the rotor;

at least one of said tie bolts having external threads at one end;

a first nut threaded onto said externally threaded end of said one tie bolt and having a plurality of facets for tightening the nut about said one tie bolt end;

a cover having a central aperture for receiving the one end of the tie bolt and a recess on one side thereof defined by an axially extending member for receiving at least a portion of said nut;

an internal surface of said member about said nut portion having a plurality of facets in excess of the number of facets on said nut; and a radially outwardly projecting portion carried by said cover for engaging a portion of said rotor for preventing rotation of the one tie bolt within the stacked wheels of the rotor.

2. An assembly according to claim 1 including a jam nut threaded onto said threaded end of said one tie bolt and on a side of said cover remote from said first nut.

3. An assembly according to claim 1 wherein said outwardly projecting portion of said cover includes a pair of projections.

4. An assembly according to claim 1 including a wheel forming part of the rotor and disposed axially adjacent said plurality of stacked wheels and said one end of said one tie bolt, a shoulder on said adjacent wheel or said plurality of stacked wheels for engagement by said projecting portion and forming a reaction surface preventing rotation of said first nut and said one tie bolt relative to said rotor.

5. An assembly according to claim 4 wherein said shoulder comprises part of an arcuate surface of a first radius, said projecting portion having an arcuate surface for engaging said shoulder and having a second radius less than said first radius.

6. An assembly according to claim 1 wherein an opposite end of said one tie bolt from said one threaded end thereof has external threads, a nut carried by said rotor against rotation relative to said rotor and threadedly receiving the opposite externally threaded end of said one tie bolt.

7. An assembly according to claim 6 wherein the number of facets on said cover member is twice the number of facets on said nut.

8. An assembly according to claim 1 wherein said one tie bolt comprises a stud externally threaded at an end thereof opposite said one end.

9. An assembly according to claim 1 including a jam nut threaded onto said threaded end of said one tie bolt and on a side of said cover remote from said first nut, including a wheel forming part of the rotor and disposed axially adjacent said plurality of stacked wheels and said one end of said one tie bolt, a shoulder on said adjacent wheel for engagement by said projecting portion and forming a reaction surface preventing rotation of said first nut and said one tie bolt relative to said rotor.

10. An assembly according to claim 9 wherein said shoulder comprises part of an arcuate surface of a first radius, said projecting portion having an arcuate surface for engaging said shoulder and having a second radius less than said first radius, wherein an opposite end of said one tie bolt from said one threaded end thereof has external threads, a nut carried by said rotor against rotation relative to said rotor and threadedly receiving the opposite externally threaded end of said one tie bolt.

11. A tie bolt and stacked wheel assembly for the rotor of a rotary machine, comprising:

a plurality of stacked wheels for rotation about a common axis and forming part of the rotor;

a plurality of elongated studs passing through said stacked wheels for retaining the stacked wheels in assembled relation relative to one another and spaced from one another circumferentially about the rotor;

each of said studs having external threads at opposite ends thereof;

first nuts threaded onto said externally threaded ends of said studs at one end thereof and having a plurality of facets for tightening the nuts about said studs at said one end thereof;

a plurality of second nuts carried by said rotor against rotation relative to said rotor and threadedly receiving the respective opposite externally threaded ends of said studs;

a plurality of covers each having a central aperture and a recess on one side thereof defined by an axially extending member for receiving at least a portion of said nut, said covers being disposed on the one ends of the studs with the one stud ends received through the apertures;

an internal surface of each said member about said first nut portion having a plurality of facets in excess of the number of facets on said nut;

a jam nut threaded on each of the one stud ends and on a side of the cover thereon remote from said first nut for preventing rotation of said first nut relative to said stud; and a radially outwardly projecting portion carried by each said cover for engaging a portion of said rotor for preventing rotation of the studs within the stacked wheels of the rotor.

12. An assembly according to claim 11 wherein said outwardly projecting portion of each said cover includes a pair of projections.

13. An assembly according to claim 11 including a wheel forming part of the rotor and disposed axially adjacent said plurality of stacked wheels and said one stud ends, a shoulder on said adjacent wheel or said plurality of stacked wheels for engagement by said projecting portion and forming a reaction surface preventing rotation of said first nuts and said studs relative to said rotor.

14. An assembly according to claim 13 wherein said shoulder comprises part of an arcuate surface of a first radius, said projecting portion having an arcuate surface for engaging said shoulder and having a second radius less than said first radius.

15. An assembly according to claim 11 wherein the number of facets on said cover members is twice the number of facets on said first nuts.

* * * * *